United States Patent
Yu

(10) Patent No.: US 7,311,460 B2
(45) Date of Patent: Dec. 25, 2007

(54) DIGITAL DATA STORAGE DEVICE MOUNTED IN A PEN SHAPED HOUSING

(75) Inventor: Hong-Chi Yu, Kaohsiung (TW)

(73) Assignee: Walton Advanced Engineering, Inc., Kaoshiung (TW)

(*) Notice: Subject to any disclaimer, the term of this patent is extended or adjusted under 35 U.S.C. 154(b) by 958 days.

(21) Appl. No.: 10/385,944

(22) Filed: Mar. 10, 2003

(65) Prior Publication Data

US 2004/0080989 A1    Apr. 29, 2004

(30) Foreign Application Priority Data

Oct. 28, 2002   (TW) ................................ 091217217

(51) Int. Cl.
*B43K 29/00*     (2006.01)
*H05K 5/00*      (2006.01)
(52) U.S. Cl. ......................................... 401/195; 361/686
(58) Field of Classification Search ................ 401/195, 401/52; 361/684, 686; 439/213; 360/55
See application file for complete search history.

(56) References Cited

U.S. PATENT DOCUMENTS

| | | | |
|---|---|---|---|
| 6,522,534 B1* | 2/2003 | Wu | 361/686 |
| 6,749,355 B2* | 6/2004 | Payne et al. | 401/195 |
| 6,808,400 B2* | 10/2004 | Tu | 439/131 |
| 6,812,972 B1* | 11/2004 | Silverbrook et al. | 348/376 |
| 6,943,670 B2* | 9/2005 | Liguori et al. | 340/321 |

\* cited by examiner

*Primary Examiner*—David J. Walczak
(74) *Attorney, Agent, or Firm*—Alan Kamrath; Kamrath & Associates P.A.

(57) ABSTRACT

A digital storage device mounted in a pen shaped housing has a barrel, a reservoir tube assembly and a memory device with a USB plug. The memory device is held in the barrel and the USB plug can be extended from the barrel to insert into a USB socket of a computer to access digital data from the computer. In addition, the memory device uses a flash memory IC for storing data so that the memory device does not use a battery. Therefore, the digital storage device can be used to store data and to perform other functions such as writing.

9 Claims, 5 Drawing Sheets

DIGITAL DATA STORAGE DEVICE MOUNTED IN A PEN SHAPED HOUSING

BACKGROUND OF THE INVENTION

1. Field of the Invention

The present invention relates to a data storage device, and more specifically to a digital data device that interfaces with electronic devices and is mounted in a pen shaped housing.

2. Description of Related Art

Pens have been very convenient tools for writing for a very long time and are easily carried. Because pens are small enough to easily carry, other functions such as laser pointers have been incorporated into pens and pen-shaped housings. Recently, portable products have been developed to process or store digital data for electronic devices such as notebook computers, PDAs, digital videos, digital cameras, etc. Therefore, a digital data processing or storage device has been adapted to be mounted in a pen shaped housing with a pen or other device to improve the utility of both the device and the portable digital data storage device mounted in the pen shaped housing.

The present invention provides a digital storage capability mounted in a relatively small pen shaped housing.

SUMMARY OF THE INVENTION

An objective of the present invention is to provide a digital data device in a pen shaped housing to interface with electronic devices. That is, the pen shaped housing can connect to a computer or other electronic device to access and store digital data from the device such as a computer.

Another objective of the present invention is to provide a digital data device in a pen shaped housing that does not require its own DC power source to maintain the memory capability.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
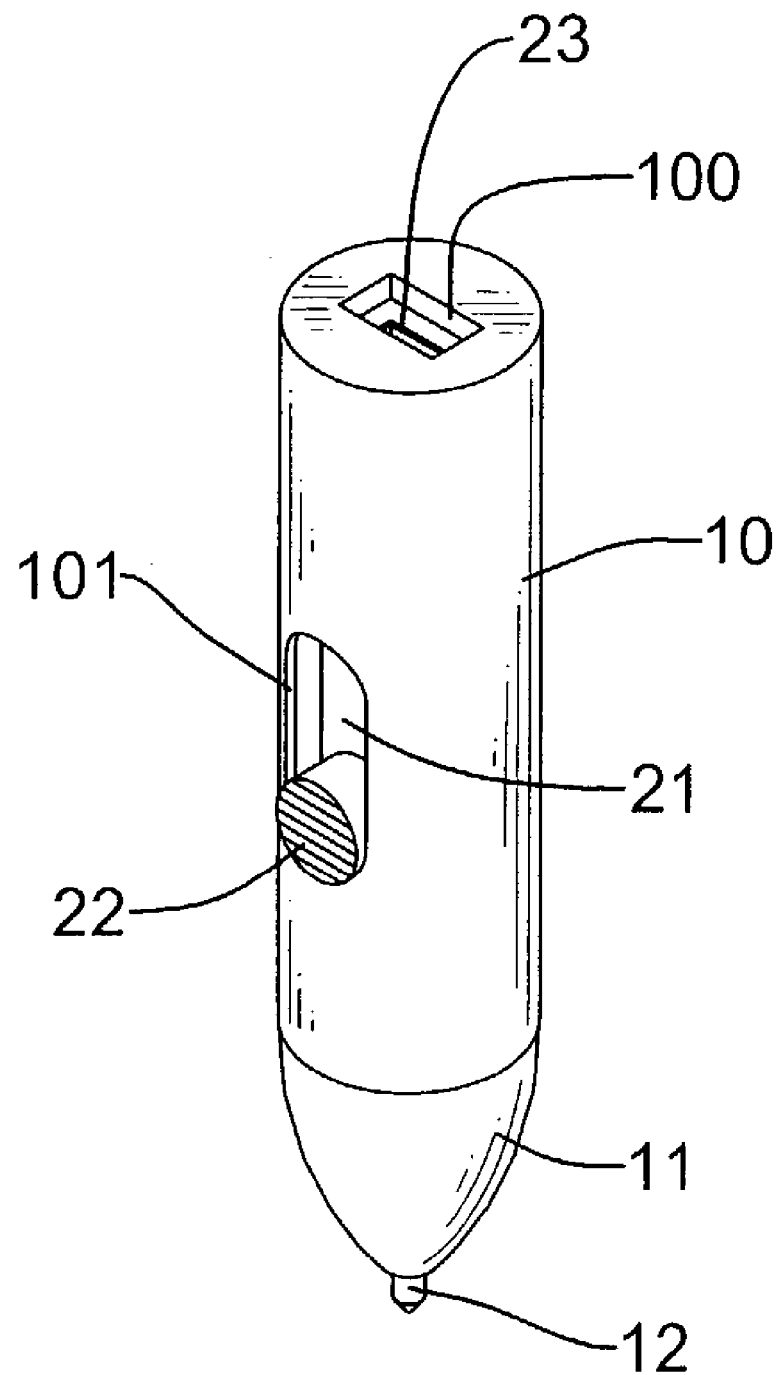
FIG. 1 is a perspective view of a first embodiment of a digital data storage device in a pen shaped housing in accordance with the present invention.
Figure 2:
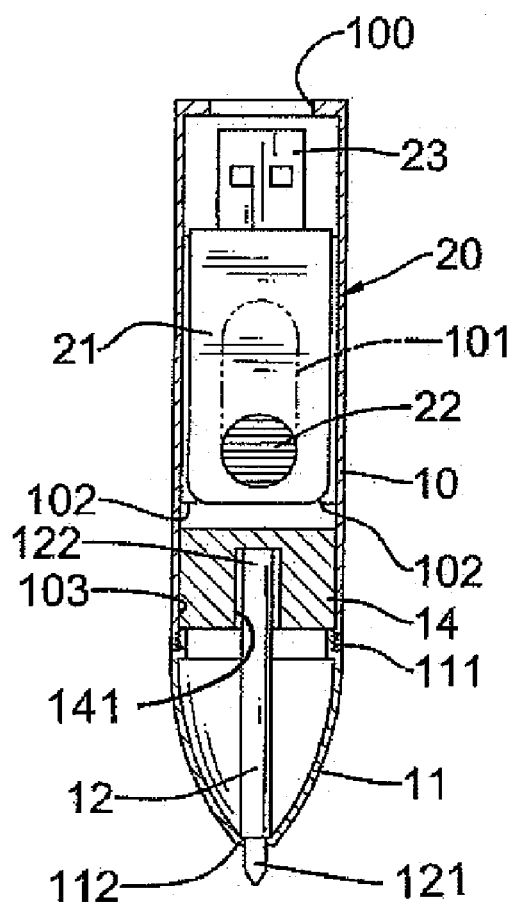
FIG. 2 is a cross sectional side plan view of the device in FIG. 1.

With reference to FIGS. 1 and 2, a first embodiment of a digital data storage device in a pen shaped housing in accordance with the present invention comprises a barrel (not numbered), a reservoir tube assembly (not numbered) and a memory device (20).

The barrel includes an upper casing (10) and a bottom casing (11). The reservoir tube assembly includes a retaining bolt (14) and a reservoir tube (12). The retaining bolt (14) has a bottom end (not numbered). The memory device (20) includes a housing (21), a memory unit (not shown) and a USB plug (23).

The upper casing (10) has an inner face (not numbered), a rectangular chamber (not numbered), a top opening (100) and a bottom opening (103). The top opening (100) is rectangular. An inner thread (not numbered) is formed in the inner face close to the bottom opening (103). The rectangular chamber is constructed of two opposite supports (102) that laterally protrude from the inner face. A long slot (101) is defined longitudinally through the upper casing (10) and communicates with the rectangular chamber.

The bottom casing (11) has a top ring (111) with an outer thread (not numbered) and a point opening (112). The bottom opening (103) of the upper casing (10) is screwed onto the top ring (111) of the bottom casing (11). The retaining bolt (14) is held in the upper casing (10) close to the bottom opening (103) of the upper casing (10). An axial recess (141) is defined in the bottom end of the retaining bolt (14). The reservoir tube (12) has a lower end (not numbered) and an upper end (122). A nib (121) is formed on the lower end, and the upper end (122) is mounted in the axial recess (141) in the retaining bolt (14). The nib (121) of the reservoir tube (12) protrudes through the point opening (112) in the bottom casing (11).

The small memory device (20) has a rectangular housing (21), a USB plug (23) and a rail (22). A flash memory IC (not shown) is used in the memory device (20) so that the memory device (20) does not need power. The housing (21) has a top edge (not numbered) from which the USB plug (23) protrudes. The USB plug (23) is rectangular and is smaller than the top opening (100) in the upper casing (10). The memory device (20) is held in the rectangular chamber, and the USB plug (23) faces the top opening (100) in the upper casing (10). The rail (22) corresponds to the long slot (101) in the upper casing (10) and is formed on the housing (21).

Figure 4:
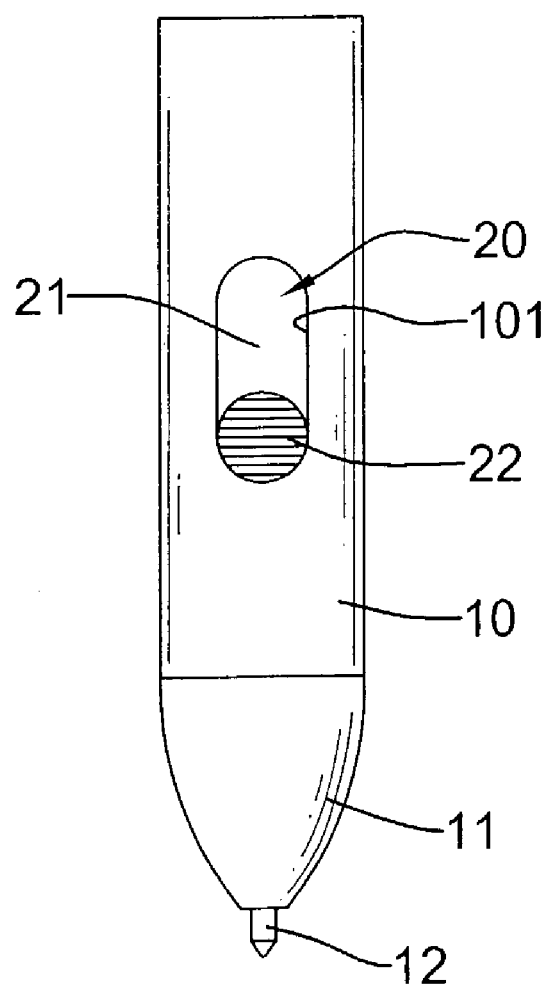
FIGS. 4A and 4B are operational side plan views of the device in FIG. 1.
Figure 4:
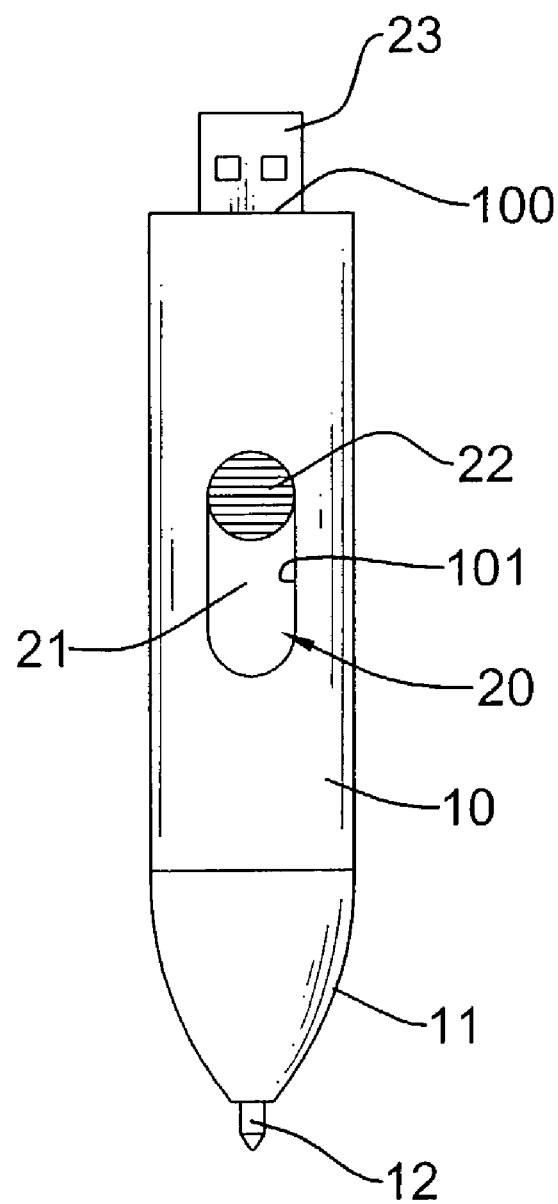
Figure 6:
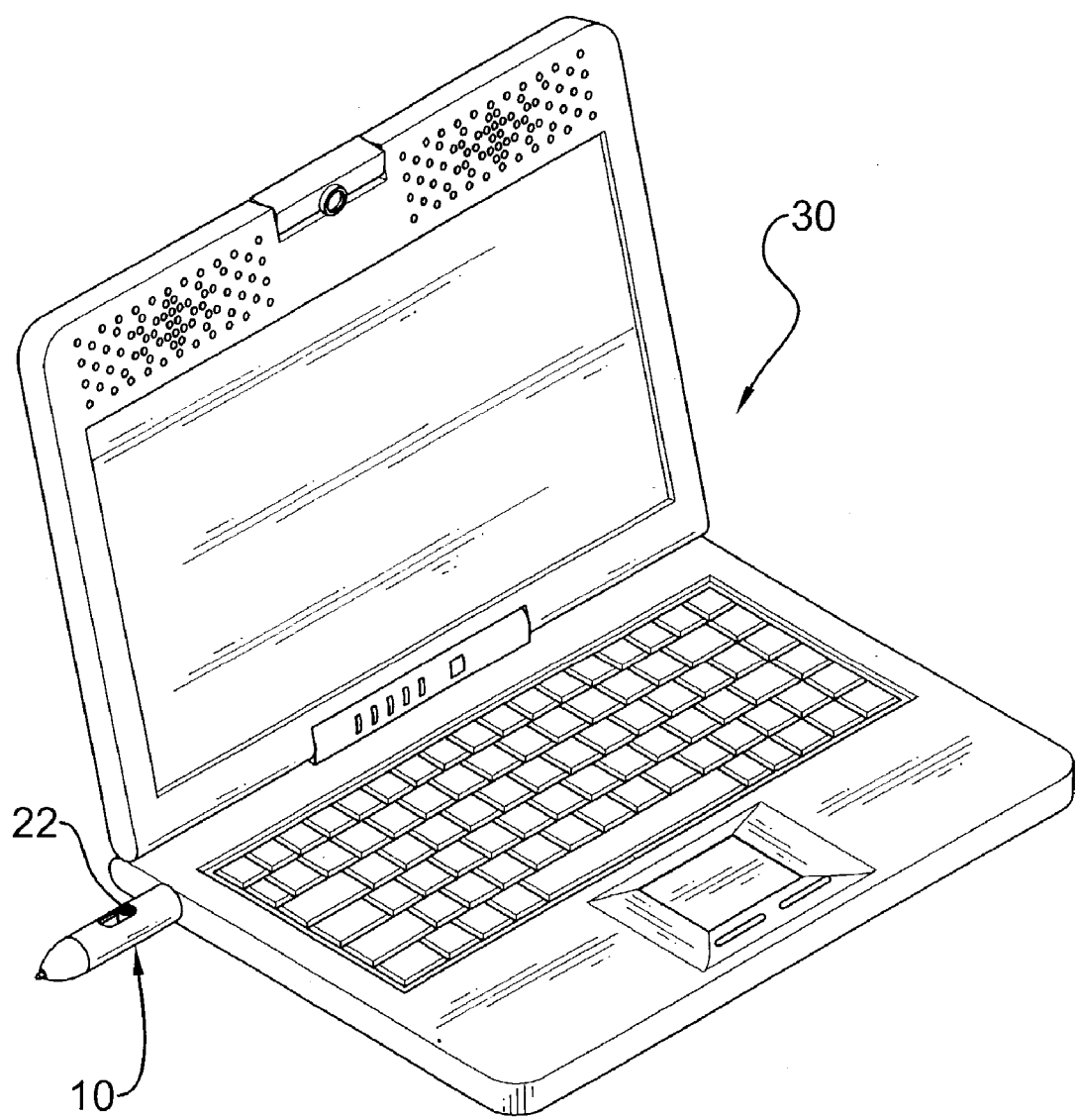
FIG. 6 is perspective view of the device in FIGS. 1, 3 or 4 attached to a computer.

With further reference to FIGS. 4A, 4B, and 6, the memory device (20) is mounted in the upper casing (10). When the digital data storage device is used, the rail (22) is pushed toward the top opening (100) so the USB plug (23) will protrude from the top opening (100) and can be inserted into a USB socket (not shown) in a computer (30) to access digital data.

Figure 3:
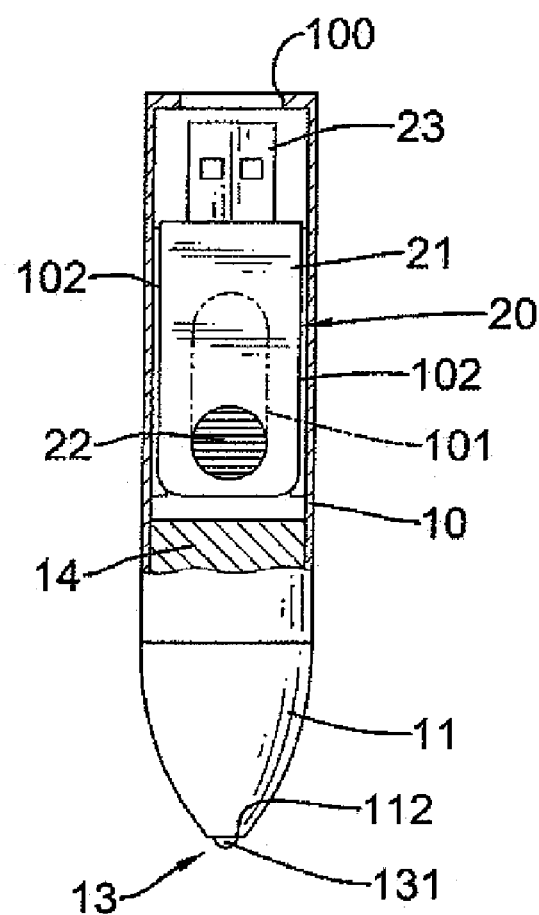
FIG. 3 is a side plan view in partial section of a second embodiment of a digital data storage device in a pen shaped housing in accordance with the present invention.

With reference to FIG. 3, a second preferred embodiment of the digital data storage device in a pen shaped housing in accordance with the present invention includes an upper casing (10), a bottom casing (11), retaining bolt (14), a memory device (20) and a laser pointer assembly (13). The laser pointer (13) replaces the reservoir tube assembly (not shown) in the previous embodiment. The laser pointer assembly (13) retained in the bottom casing (11) comprises a laser pointer (131), a battery (not shown), wherein the laser pointer (131) protrudes from the point opening (112) in the bottom casing (11) and the battery is connected to the laser pointer (131) and against to the retaining blot (14) in the bottom casing (11).

Figure 5:
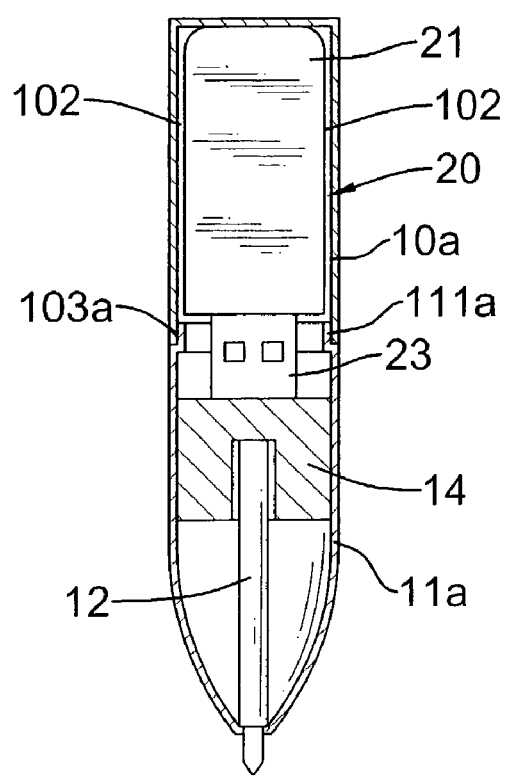
FIGS. 5A and 5B are operational cross sectional side plan views of a third embodiment of a digital data storage device in a pen shaped housing in accordance with the present invention.
Figure 5:
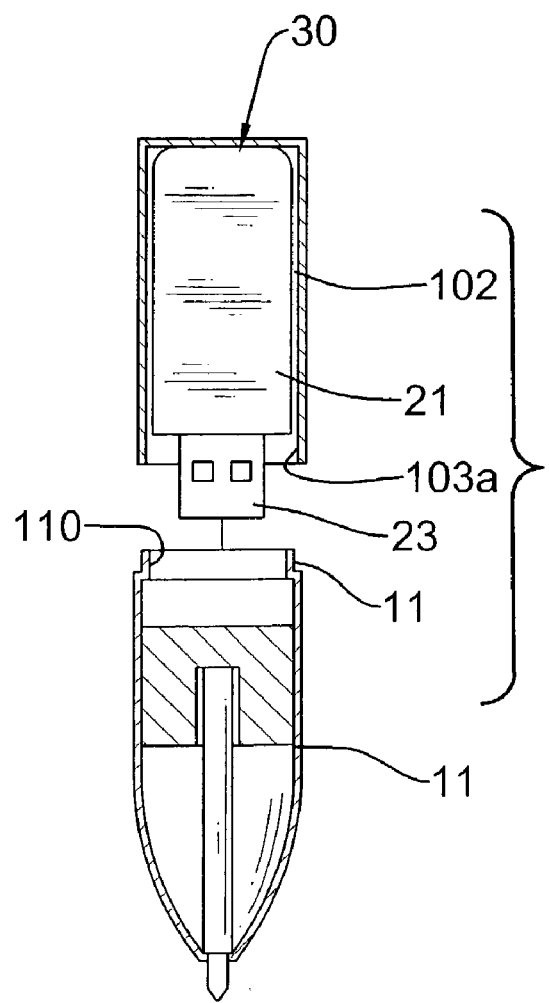

With reference to FIGS. 5A and 5B, a third preferred embodiment of the digital data storage device in a pen shaped housing in accordance with the present invention includes an upper casing (10a), a bottom casing (11a), a retaining bolt (14), a reservoir tube (12) and a memory device (20). The upper casing (10a) has a bottom opening (103a), and the bottom casing (11a) has a point opening (not numbered) and a top ring (111a) that is smaller than the bottom opening (103a) of the upper casing (10a). The retaining bolt (14) and the reservoir tube (12) are held in the bottom casing (11a). The memory device (20) with the USB plug is securely mounted in the upper casing (10a). The USB plug (23) faces and protrudes from the bottom opening (103a). The upper casing (10a) and the bottom casing (11a) are joined together by inserting the top ring (111a) into the bottom opening (103a) of the upper casing (10a). When the upper casing (10a) is separated from the bottom casing (11a), the USB plug (23) is exposed and can be inserted into a USB socket (not shown) in the computer (not shown).

The digital memory device for a computer or other electronic devices with USB socket is in a pen like housing. The pen like housing can be carried conveniently and also hold a portable writing instrument or pointing tool.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A digital storage device mounted in a pen shaped housing, comprising:
   a barrel having
      an upper casing having a long slot, a bottom opening and a top rectangular opening; and
      a bottom casing detachably connected to the upper casing;
   a reservoir tube assembly held in the barrel; and
   a memory device movably mounted in the upper casing, wherein the memory device has a housing, a memory unit, a rail corresponding to the long slot on the upper casing and a USB plug, with the top rectangular opening corresponding to the USB plug, wherein the USB plug protrudes from the housing and corresponds to the top rectangular opening.

2. The digital storage device mounted in a pen shaped housing as claimed in claim 1, wherein
   an inner thread is formed in the upper casing close to the bottom opening; and
   the bottom casing has a top ring with an outer thread screwed to the upper casing.

3. The digital storage device mounted in a pen shaped housing as claimed in claim 2, wherein the upper casing further comprises a rectangular chamber constructed of two opposite supporters that are formed in the upper casing to securely hold the housing of the memory device, wherein the housing is rectangular and smaller than the rectangular chamber.

4. The digital storage device mounted in a pen shaped housing as claimed in claim 3, wherein the reservoir tube assembly comprises a reservoir tube and a retaining bolt in the barrel, wherein the bottom casing has a point opening through which the reservoir tube protrudes.

5. The digital storage device mounted in a pen shaped housing as claimed in claim 4, wherein the reservoir tube has an upper end and a bottom end, wherein a nib is attached to the bottom end and protrudes from the point opening in the bottom casing and an axial recess is defined in the bottom end of the retaining bolt to hold the upper end of the reservoir tube.

6. The digital storage device mounted in a pen shaped housing as claimed in claim 1, wherein the upper casing further comprises a rectangular chamber constructed of two opposite supporters that are formed in the upper casing to securely hold the housing of the memory device, wherein the housing is rectangular shaped and smaller than the rectangular chamber.

7. The digital storage device mounted in a pen shaped housing as claimed in claim 6, wherein the reservoir tube assembly comprises a reservoir tube and a retaining bolt in the barrel, wherein the bottom casing has a point opening through which the reservoir tube protrudes.

8. The digital storage device mounted in a pen shaped housing as claimed in claim 7, wherein the reservoir tube has an upper end and a bottom end, wherein a nib is attached to the bottom end and protrudes from the point opening in the bottom casing and an axial recess is defined in the bottom end of the retaining bolt to hold the upper end of the reservoir tube.

9. The digital storage device mounted in a pen shaped housing as claimed in claim 1, wherein the memory unit is a flash memory.

* * * * *